(12) United States Patent  (10) Patent No.: US 8,576,541 B2
Gadkaree et al.  (45) Date of Patent: Nov. 5, 2013

(54) ELECTROLYTE SYSTEM

(75) Inventors: Kishor Purushottam Gadkaree, Painted Post, NY (US); Shrisudersan Jayaraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 211 days.

(21) Appl. No.: 12/897,071

(22) Filed: Oct. 4, 2010

(65) Prior Publication Data

US 2012/0081837 A1  Apr. 5, 2012

(51) Int. Cl.
H01G 9/155 (2011.01)
H01G 9/02 (2006.01)

(52) U.S. Cl.
USPC .......................... 361/502; 361/503; 252/62.2

(58) Field of Classification Search
USPC .................................. 361/502–503; 252/62.2
See application file for complete search history.

(56) References Cited

U.S. PATENT DOCUMENTS

| | | | | |
|---|---|---|---|---|
| 5,418,682 A * | 5/1995 | Warren et al. | ................. | 361/502 |
| 5,750,284 A | 5/1998 | Pendalwar et al. | ........... | 429/197 |
| 6,201,685 B1 | 3/2001 | Jerabek et al. | ................. | 361/502 |
| 6,212,062 B1 | 4/2001 | Day et al. | ...................... | 361/502 |
| 6,225,733 B1 | 5/2001 | Gadkaree et al. | ............. | 313/352 |
| 6,304,426 B1 | 10/2001 | Wei et al. | ...................... | 361/502 |
| 6,487,066 B1 | 11/2002 | Niiori et al. | .................... | 361/502 |
| 6,491,841 B1 | 12/2002 | Maletin et al. | ............... | 252/62.2 |
| 6,565,701 B1 | 5/2003 | Jerabek et al. | ................ | 156/305 |
| 6,714,391 B2 | 3/2004 | Wilk et al. | ....................... | 361/15 |
| 6,728,096 B1 * | 4/2004 | Smith et al. | .................... | 361/523 |
| 6,738,252 B2 | 5/2004 | Okamura et al. | ............. | 361/502 |
| 6,984,471 B2 | 1/2006 | Suzuki et al. | ................. | 429/330 |
| 7,233,481 B2 | 6/2007 | Fujino | ............................ | 361/502 |
| 7,297,289 B2 | 11/2007 | Sato et al. | .................... | 252/62.2 |
| 7,314,514 B2 | 1/2008 | Drummond et al. | .......... | 106/311 |
| 7,385,801 B2 | 6/2008 | Ando et al. | ..................... | 361/503 |
| 7,425,283 B2 | 9/2008 | Nakanishi et al. | ....... | 252/519.31 |
| 7,436,651 B2 | 10/2008 | Takeda et al. | ................. | 361/502 |
| 7,443,651 B2 | 10/2008 | Ando et al. | ..................... | 361/503 |
| 7,466,539 B2 | 12/2008 | Dementiev et al. | ........... | 361/502 |
| 7,656,645 B2 * | 2/2010 | Chiba | .......................... | 361/502 |
| 7,675,737 B1 * | 3/2010 | Smith et al. | .................... | 361/523 |
| 2003/0158342 A1 | 8/2003 | Shinozaki et al. | | |
| 2004/0085710 A1 | 5/2004 | Takeuchi et al. | .............. | 361/502 |
| 2004/0096747 A1 | 5/2004 | Schwake | ....................... | 429/326 |
| 2005/0127319 A1 | 6/2005 | Fujioka et al. | ............... | 252/62.2 |
| 2005/0211136 A1 | 9/2005 | Drummond et al. | .......... | 106/311 |
| 2005/0220989 A1 | 10/2005 | Chaturvedi et al. | | |
| 2006/0057433 A1 | 3/2006 | Ando et al. | ........................ | 429/9 |
| 2006/0092597 A1 | 5/2006 | Takeda et al. | ................. | 361/503 |
| 2007/0002522 A1 * | 1/2007 | Takeda et al. | ................. | 361/502 |
| 2007/0002524 A1 | 1/2007 | Ando et al. | ..................... | 361/503 |
| 2008/0055819 A1 | 3/2008 | Taguchi et al. | ............... | 361/504 |

(Continued)

FOREIGN PATENT DOCUMENTS

EP  1947663  7/2008
JP  52071630  12/1975

(Continued)

*Primary Examiner* — Eric Thomas
(74) *Attorney, Agent, or Firm* — Lisa M. Noni; Jason A Barron

(57) ABSTRACT

An electrolyte system having a conductive salt dispersed in a solvent mixture, the solvent mixture having an organic nitrile solvent and a co-solvent. The concentration of the conductive salt in the electrolyte system is 1.25 molar to 3.0 molar.

7 Claims, 2 Drawing Sheets

(56) References Cited

U.S. PATENT DOCUMENTS

| | | | |
|---|---|---|---|
| 2008/0094778 A1 | 4/2008 | Tanizaki et al. | 361/504 |
| 2008/0165471 A1 | 7/2008 | Kojima et al. | 361/503 |
| 2008/0220329 A1 | 9/2008 | Kojima et al. | 429/188 |
| 2009/0023066 A1 | 1/2009 | Kojima et al. | 429/221 |
| 2009/0027831 A1 | 1/2009 | Tasaki et al. | 361/523 |
| 2009/0029257 A1 | 1/2009 | Ando et al. | 429/231.95 |
| 2011/0182000 A1* | 7/2011 | Gadkaree et al. | 361/502 |

FOREIGN PATENT DOCUMENTS

| | | | |
|---|---|---|---|
| JP | 04-026075 | | 1/1992 |
| JP | 04206167 A | * | 7/1992 |
| JP | 1992206167 A | | 7/1992 |
| WO | 9960587 A1 | | 11/1999 |
| WO | 02/061776 | | 8/2002 |

* cited by examiner

ELECTROLYTE SYSTEM

FIELD OF THE DISCLOSURE

This disclosure relates to an electrolyte system and an electrolytic cell comprising the electrolyte system.

BACKGROUND

Ultracapacitors, also known as, electric double layer capacitors (EDLCs), are energy storage devices. Unlike batteries, which store energy chemically, EDLCs store energy electrostatically. Ultracapacitors may be utilized in many applications where pulse power is required. These applications range from small size devices for cell phones to large size devices in hybrid vehicles. The ultracapacitor device design is described in many patents and patent applications, for example—US2004/0085710, U.S. Pat. No. 6,738,252, U.S. Pat. No. 6,487,066, U.S. Pat. No. 6,565,701, U.S. Pat. No. 6,714,391, U.S. Pat. No. 6,304,426, U.S. Pat. No. 6,212,062, and U.S. Pat. No. 6,201,685.

Typically EDLC devices consist of carbon electrodes separated via a porous separator, a current collector, and an organic electrolyte. The energy density and the specific power of the devices are determined by the properties of the carbon electrode and the electrolyte utilized. In using various electrolytes it should be kept in mind that electrolyte conductivity is an important parameter. High power may be obtained from the device if the electrolyte conductivity is high. The energy density of ultracapacitors currently available is in the range of 6-7 Wh/l and may not be sufficient for some of the applications mentioned above.

Attempts have been made to fabricate Li ion based ultracapacitors to address the high energy density need. These patents describe capacitors which require a lithium metal electrode to be incorporated in the device. The presence of lithium metal electrode raises safety issues. In addition, these electrodes take up space, reduce power density, make the fabrication of the device more complicated, require that the carbon electrode have porosity to transport lithium ions thus increasing device cost and reduce energy density.

Attempts have also been made to develop electrolytes with higher voltage capability. For example U.S. Pat. No. 7,466,539, U.S. Pat. No. 7,425,283, and others describe organosilicon compounds as electrolytes, U.S. Pat. No. 7,297,289 describes ionic liquids as electrolyte, and other patents such as U.S. Pat. No. 6,491,841 describe new ionic salts for use in electrochemical capacitors for increased voltage rating. However none these have been adopted for use because of lack of desired performance.

A new high energy density ultracapacitor device is thus needed which has adequate power density.

SUMMARY

Currently available devices use electrolyte systems of a salt of tetraethyl ammonium-tetrafluoroborate (TEA-TFB) in acetonitrile solvent which limits the voltage to about 2.7 volts. It has been discovered that addition of an organic ester to the nitrile solvent with the electrolyte salt results in significantly increased voltage stability of the electrolyte. Higher voltage operation of the device incorporating the electrolyte results in significantly higher energy density and power from these devices. The new electrolyte system allows voltages up to 4 volts and thus a significant increase in energy and power density over what has been shown previously with addition of low cost readily available compounds.

A first embodiment is an electrolyte system comprising a conductive salt dispersed in a solvent mixture, wherein a concentration of the conductive salt in the electrolyte system is 1.25 molar to 3.0 molar and the solvent mixture comprises an organic nitrile solvent and a co-solvent.

A second embodiment is an electrolytic cell comprising two electrodes wherein at least one of the electrodes comprises activated carbon and an electrolyte system comprising a conductive salt dispersed in a solvent mixture, wherein a concentration of the conductive salt in the electrolyte system is 1.25 molar to 3.0 molar and the solvent mixture comprises an organic nitrile solvent and a co-solvent.

Additional features and advantages will be set forth in the detailed description which follows, and in part will be readily apparent to those skilled in the art from the description or recognized by practicing the embodiments as described in the written description and claims hereof.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
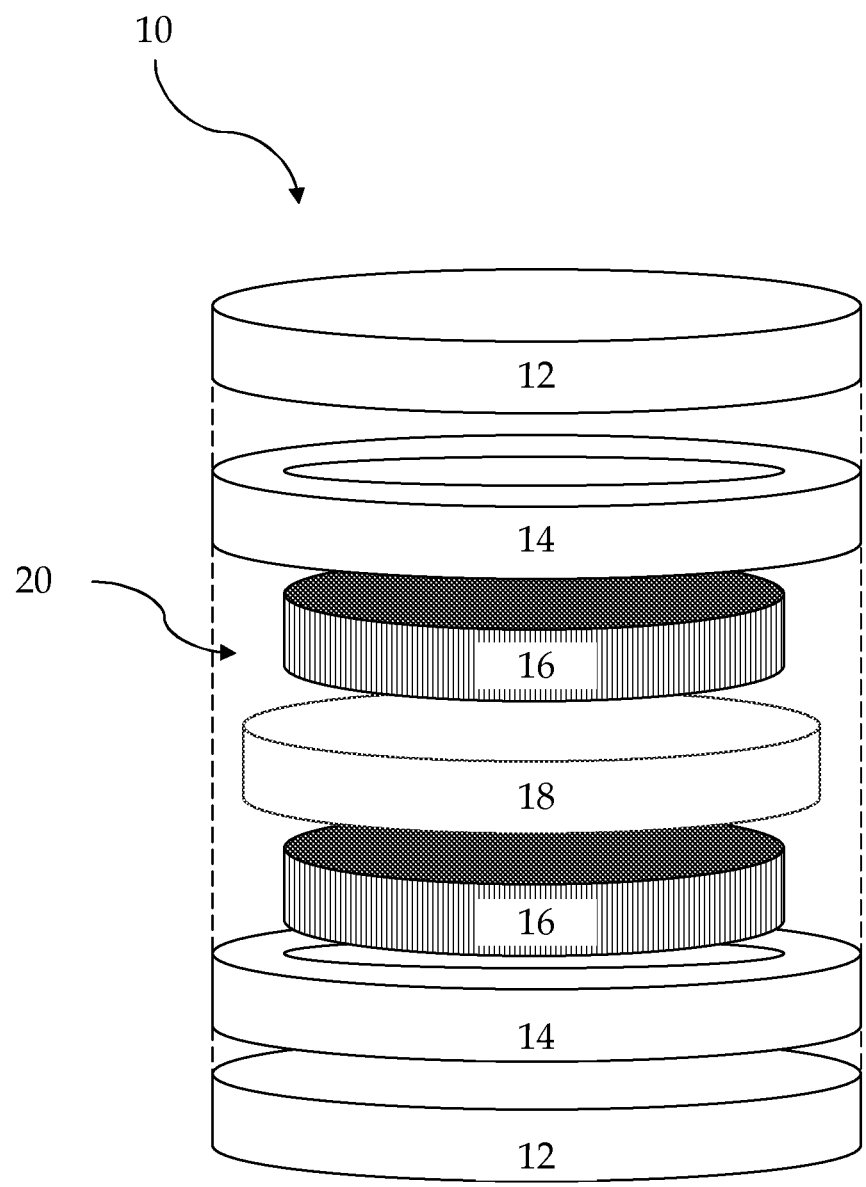
FIG. 1 is a schematic of a button cell view according to embodiments.

As disclosed herein, an electrolyte system comprises a conductive salt dispersed in a solvent mixture, wherein a concentration of the conductive salt in the electrolyte system is 1.25 molar to 3.0 molar and the solvent mixture comprises an organic nitrile solvent and a co-solvent.

In embodiments, conductive salts include quaternary ammonium salts, cyclic aromatic imidazolium salts, or asymmetric ammonium salts. Specific examples of conductive salts include tetraethyl ammonium tetrafluoroborate ($Et_4NBF_4$), tetraethyl ammonium hexafluorophosphate ($Et_4NPF_6$), $Et_3MeNBF_4$, $Et_4NBF_4$, $EMIPF_6$ and EMIIm, ethylmethyldi(iso-propyl)ammonium hexafluorophosphate ($EtMeiPr_2N+PF_6-$), ethylmethyldi(iso-propyl)ammonium bis(trifluoromethane sulfonyl)imide ($EtMeiPr_2N+Im-$), methyltripropylammonium hexafluorophosphate ($Pr_3MeN+PF_6-$), ethyldimethylsulfonium hexafluorophosphate ($EtMe_2S+PF_6-$), triethylmethylammonium bis(trifluoromethane sulfonyl)imide ($Et_3MeN+Im-$), triethylmethylphosphonium hexafluorophosphate ($Et_3MeP+PF_6-$) and other salts known in the literature for use in electrolyte applications. The electrolyte may comprise one or more conductive salts. In one embodiment, the conductive salt is tetraethyl ammonium tetrafluoroborate.

In embodiments, the concentration of conductive salt in the electrolyte system may be from 1.25 M to 3.0 M, for example, 1.25 M, 1.5 M, 1.75 M, 2.0 M, 2.25 M, 2.5 M, 2.75 M, or 3.0 M.

As disclosed herein, the electrolyte system comprises a solvent mixture comprising an organic nitrile solvent and a co-solvent. In some embodiments, the organic nitrile solvent is acetonitrile. In some embodiments, the co-solvent is an organic ester. The co-solvent may be selected from ethylene carbonate, propylene carbonate, dimethyl carbonate, diethyl carbonate, ethyl-methyl carbonate, and butylene carbonate.

In embodiments, the amount of the co-solvent in the solvent mixture may be from 1% to 75% by weight, for example 5%, 15%, 25%, 50%, 60%, or 75%.

Embodiments of the electrolyte system as disclosed herein have a conductivity greater than 45 mS/cm at ambient temperature.

As disclosed herein, a method of making the electrolyte system disclosed above comprises combining an organic nitrile solvent, a co-solvent, and a conductive salt to form a mixture and stirring the mixture to form the electrolyte system.

The electrolyte system as described above may be used in an electrolytic cell, for example, an EDLC. As disclosed herein, an electrolytic cell comprises two electrodes wherein at least one of the electrodes comprises activated carbon and an electrolyte system comprising a conductive salt dispersed in a solvent mixture, wherein a concentration of the conductive salt in the electrolyte system is 1.25 molar to 3.0 molar and the solvent mixture comprises an organic nitrile solvent and a co-solvent.

Electrodes generally comprise porous carbon or activated carbon materials. The two electrodes can be configured identically or different from one another. Thus, the description of various characteristics of electrodes can be applied to either one or both electrodes. It should be understood that either electrode, or both electrodes can independently have any or all of the characteristics discussed herein.

In embodiments, at least on electrode comprises activated carbon. An electrode that includes a majority (by weight) of activated carbon is referred to herein as an "activated carbon electrode." In embodiments, an activated carbon electrode includes greater than about 50 wt % activated carbon (e.g., greater than 50, 60, 70, 80, 90, or 95 wt % activated carbon). An activated carbon electrode may include materials other than activated carbon. In embodiments, either one or both electrodes can comprise an activated carbon electrode. For example, one electrode can include a majority of activated carbon and the other electrode can include a majority of graphite. In embodiments, both the first electrode and the second electrode are activated carbon electrodes.

In embodiments, the activated carbon can have a relatively high carbon surface area. Utilizing activated carbon with a relatively high surface area can provide the cell with a relatively high energy density. In embodiments, the activated carbon that is utilized in an electrode can have a carbon surface area of at least about 100 $m^2/g$ (e.g., at least about 1000 or 1500 $m^2/g$). Specific examples of activated carbon that may be utilized include coconut shell-based activated carbon, petroleum coke-based activated carbon, pitch-based activated carbon, polyvinylidene chloride-based activated carbon, polyacene-based activated carbon, phenolic resin-based activated carbon, polyacrylonitrile-based activated carbon, and activated carbon from natural sources such as coal, charcoal or other natural organic sources.

In embodiments, the activated carbon electrode comprises pores having a size of ≤1 nm, which provide a combined pore volume of ≥0.3 $cm^3/g$; pores having a size of from >1 nm to ≤2 nm, which provide a combined pore volume of ≥0.05 $cm^3/g$; and <0.15 $cm^3/g$ combined pore volume of any pores having a size of >2 nm.

Electrodes can include one or more binders. Binders can function to provide mechanical stability to an electrode by promoting cohesion in loosely assembled particulate materials. Binders can include polymers, co-polymers, or similar high molecular weight substances capable of binding the activated carbon (and other optional components) together to form porous structures. Specific exemplary binders include polytetrafluoroethylene (PTFE), polyvinylidene fluoride, or other fluoropolymer particles; thermoplastic resins such as polypropylene, polyethylene, or others; rubber-based binders such as styrene-butadiene rubber (SBR); and combinations thereof. In embodiments, PTFE can be utilized as a binder. In further embodiments, fibrillated PTFE can be utilized as a binder. By way of example, an electrode can include up to about 20 wt % of binder (e.g., up to about 5, 10, 15, or 20 wt %).

An electrode can also include one or more conductivity promoters. A conductivity promoter functions to increase the overall conductivity of the electrode. Exemplary conductivity promoters include carbon black, natural graphite, artificial graphite, graphitic carbon, carbon nanotubes or nanowires, metal fibers or nanowires, graphenes, and combinations thereof. In embodiments, carbon black can be used as a conductivity promoter. In embodiments, an electrode can include up to about 10 wt % of a conductivity promoter. For example, an electrode can include from about 1 wt % to about 10 wt % of conductivity promoter (e.g., 1, 2, 4, or 10 wt %).

Various embodiments will be further clarified by the following examples.

EXAMPLES

An embodiment of an EDLC, a button cell device, is shown in FIG. 1. The button cell 10 includes two current collectors 12, two sealing members 14, two electrodes 16, a separator 18, and an electrolyte solution 20. Two electrodes 16, each having a sealing member 14 disposed around the periphery of the electrode, are disposed such that the electrode 16 maintains contact with a current collector 12. A separator 18 is disposed between the two electrodes 16. An electrolyte solution 20 is contained between the two sealing members.

Button cells were fabricated with free-standing carbon electrodes (containing active carbon, carbon black and fibrillated PTFE in the weight ratio 85:5:10). As shown in FIG. 1, the button cell 10 was assembled by stacking the following components in order: current collector 12, electrode 16 with sealing member 14 disposed around the periphery of the electrode 16, separator 18, electrode 16 with sealing member 14 disposed around the periphery of the electrode 16, and current collector 12. The current collectors were platinum foil, both electrodes were carbon, and the separator was cellulose paper. The carbon electrodes and the separator were soaked in an electrolyte solution prior to assembly. An extra drop of the electrolyte solution was added to the cell after placing the second carbon electrode and before placing the second current collector. Finally, the cell was sealed by heating the thermoset sealant.

Electrochemical experiments included cyclic voltammetry (CV), electrochemical impedance spectroscopy (EIS) and galvanostatic charge/discharge. Cyclic voltammetry experiments were typically performed at a scan rate of 20 mV/sec with various potential windows (the maximum range was 0 to 4.5 V). EIS included measuring impedance while applying an AC perturbation with amplitude of 10 mV over a constant DC voltage of 0 V in the frequency range of 0.01-10,000 Hz. Galvanostatic charge/discharge experiments were performed at a current magnitude of 10 mA.

The energy density of the device was calculated using the "Integrated energy method." It consisted of numerically integrating the Galvanostatic data (Potential vs. time data) and multiplying it by the discharge current to obtain the actual energy (in W.s) delivered by the device between two potentials $V_1$ and $V_2$.

$$\text{Energy} = I_{disch} * \int_{V_1}^{V_2} V dt$$

Energy density can then be calculated by dividing the actual energy delivered by the device volume and appropriate conversion factors to express it in Wh/L.

$$\text{Energy density (Wh/L)} = \frac{\text{Energy (W} \cdot \text{s)}}{\text{Device Volume (cc)}} \times \frac{1000 \text{ (cc/L)}}{3600 \text{ (s/h)}}$$

The device capacitance ($C_{device}$, Farads) can be calculated from the energy as follows:

$$C_{device} = \frac{2 \times I_{disch} \times \int_{V_1}^{V_2} V dt}{(V_1^2 - V_2^2)}$$

Activated carbon electrodes were fabricated. Activated carbon was mixed with carbon black in 85:5 ratio. Polytetrafluoroethylene (PTFE) was added to the mixture to make a 85:5:10 ratio of carbon:carbon black:PTFE. The resulting material was added to isopropyl alcohol, mixed, and dried. The material was then pressed into a preform about 10 mil thick to form electrodes. The electrodes were then rolled onto current collectors—aluminum sheets coated with a conductive commercial paint. The electrodes were then dried to about 150° C. overnight in a vacuum oven and assembled into a capacitor device with the desired electrolyte solution.

Example 1

Comparative

Activated carbon electrodes were fabricated via the process above with activated carbon having with surface area of 1800 m²/g synthesized in-house. The electrolyte system used in this experiment was standard 1.5M tetraethyl ammonium-tetrafluoroborate in acetonitrile. The energy density obtained was 17 Wh/l. Voltage could not be increased beyond 2.7 volts due to electrolyte degradation. The electrolyte conductivity in this case was 65.8 mS/cm.

Example 2

Inventive

Activated carbon electrodes were fabricated via the process above with the same activated carbon powder as in Example 1. The device was assembled with 1.5 M TEA-TFB dissolved in 10:90 ratio of ethylene carbonate to acetonitrile. Voltage up to 4 volts was applied without electrolyte degradation. The energy density of this device was 30 Wh/l showing a significant increase in energy density over Example 1. The electrolyte conductivity in this case was 45.3 mS/cm.

Example 3

Inventive

Figure 2:
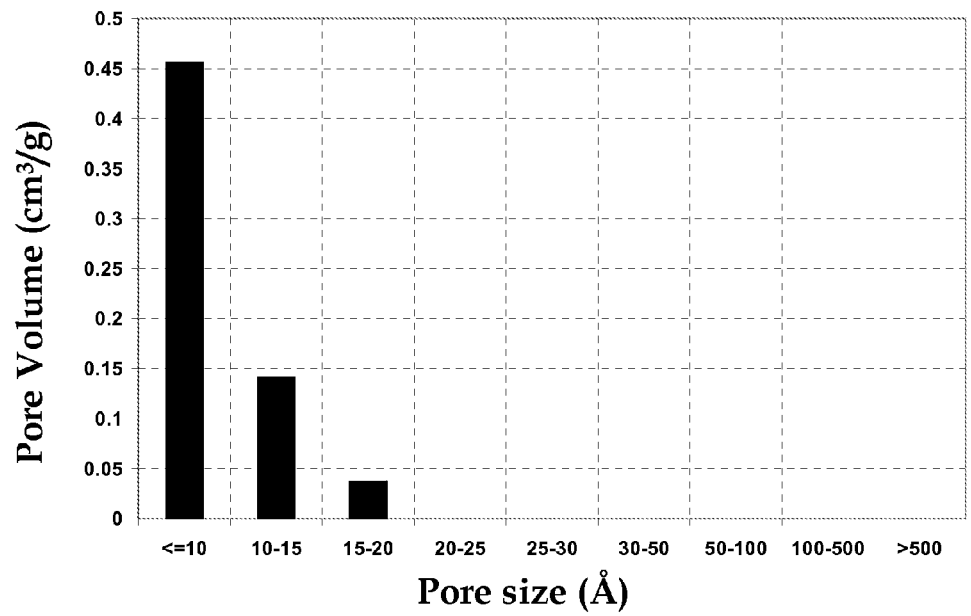
FIG. 2 is a graph showing pore size distribution of the activated carbon used in Example 3.

The experiment of Example 2 was repeated but in this case the electrolyte contained 1.5M TEA-TFB in 25:75 ratio of EC:acetonitrile. The device could be cycled to 4 volts without any degradation. Resulting energy density of 32 Wh/L showed an almost 2× increase in energy density. The electrolyte conductivity in this case was 51.5 mS/cm. The pore size distribution of the carbon used in this experiment is given below in FIG. 2.

Example 4

Comparative

Figure 3:
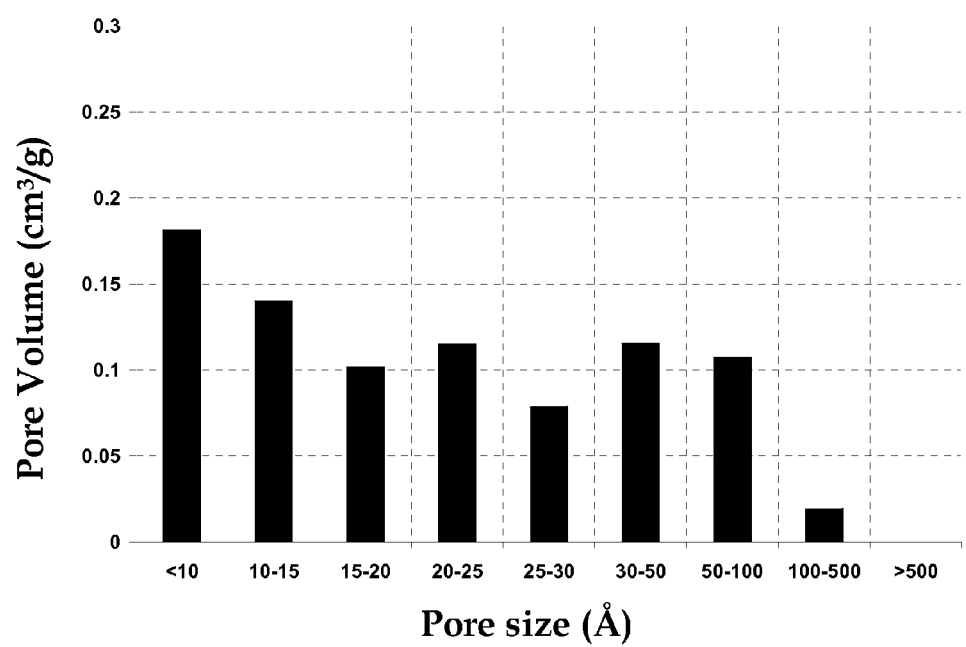
FIG. 3 is a graph showing pore size distribution of the activated carbon used in Example 4.

The experiment of Example 3 was repeated with an activated carbon having a pore size distribution given in FIG. 3. The energy density obtained was 19 Wh/l, significantly lower than obtained in Example 3. This data indicated the importance of pore size distribution.

Example 5

Inventive

The experiment in Example 3 was carried out with propylene carbonate as the additive in acetonitrile, with acetonitrile to propylene carbonate ratio of 75:25. In this case the device could be operated at 4 V and the energy density obtained was 26 Wh/L, again significantly higher than the standard electrolyte demonstrated in Example 1. The electrolyte conductivity in this case was 48.4 mS/cm.

These examples demonstrate increases in energy density obtainable by additions of an organic ester to nitrile solvent with standard electrolyte salts. Generally, the ratios of the mixed solvents should be chosen so that conductivity of the solvent mixture does not drop below 40 mS/cm causing the power density of the devices to suffer. Pore size distribution of the carbon also plays a part in enhancing energy density and should be chosen to optimize energy density.

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used on the specification and claims are to be understood as being modified in all instances by the term "about", whether or not so stated. It should also be understood that the precise numerical values used on the specification and claims form additional embodiments of the invention.

What is claimed is:

1. An electrolytic cell comprising:
    two electrodes;
        wherein at least one of the electrodes comprises activated carbon;
        wherein the activated carbon electrode comprises:
            pores having a size of ≤1 nm, which provide a combined pore volume of ≥0.3 cm³/g;
            pores having a size of from >1 nm to ≤2 nm, which provide a combined pore volume of ≥0.05 cm³/g; and
            <0.15 cm³/g combined pore volume of any pores having a size of >2 nm;

an electrolyte system comprising:
   a conductive salt selected from the consisting of quaternary ammonium salts, cyclic aromatic imidazolium salts, and asymmetric ammonium salts dispersed in a solvent mixture,
   wherein a concentration of the conductive salt in the electrolyte system is from about 1.25 molar to about 3.0 molar; and
   the solvent mixture comprises an acetonitrile and a co-solvent.

2. An electrolytic cell of claim 1, wherein the electrolytic cell is an electric double layer capacitor.

3. An electrolytic cell of claim 1 wherein the concentration of the conductive salt in the electrolyte system is about 1.5 molar.

4. An electrolytic cell of claim 1, wherein the co-solvent is an organic ester.

5. An electrolytic cell of claim 1, wherein the co-solvent is selected from ethylene carbonate, propylene carbonate, dimethyl carbonate, diethyl carbonate, ethyl-methyl carbonate, and butylene carbonate.

6. An electrolytic cell of claim 1, wherein an amount of the co-solvent in the solvent mixture is from about 1 to about 75% by weight.

7. An electrolytic cell of claim 1 having a conductivity greater than 45 mS/cm at ambient temperature.

* * * * *